Patented Nov. 8, 1938

2,135,591

UNITED STATES PATENT OFFICE 2,135,591

SOY BEAN FLOUR

Rollin H. Moulton, Western Springs, Ill., assignor to Soy Bean Products Co., Chicago, Ill., a corporation of Illinois No Drawing. Application January 27, 1937, Serial No. 122,569

15 Claims. (Cl. 99—99)

This invention pertains to processing soy bean nuts and more particularly to a method of producing soy bean flour.

There have been numerous attempts heretofore to produce soy bean flour, but the flour so produced has been of a delicate nature, that is, it becomes rancid very quickly and great care must be exercised in providing suitable containers for maintaining this flour so that little or no air can reach it. Also, this flour has a vegetable, weedy, or so-called "alfalfa" taste which is highly objectionable, and thus in using this flour in the production of bread or bread products, only about 3% soy bean flour can be used or the bread becomes bitter and spoils very quickly.

It is therefore an object of this invention to provide a process for producing soy bean flour, which flour so produced is sweet, remains fresh for a long period of time, and is inexpensive to produce.

Another object is to provide a soy bean flour which is of such character that it may be used with other flours in the production of bread, rolls or bread products, to the extent of 50% if desired.

Still another object is to provide a soy bean flour in which the freshness and flavor thereof are retained indefinitely even after the container therefor has been opened.

With these and various other objects in view, the invention may consist of certain novel features as will be more fully described and particularly pointed out in the specification and claims appended hereto.

In practicing the invention contemplated herein of producing a desirable soy bean flour, a suitable quantity of soy beans is placed in large vessels, preferably non-metallic crocks, and enough water is added so that the beans will swell to substantially twice their normal size, that is, the large diameter of the soaked bean will be substantially twice that of the unsoaked bean, and the length of the soaked bean will be substantially twice that of the unsoaked bean. The temperature of the added water is substantially room temperature, that is, 70° F., and the beans are soaked a sufficient time to absorb about 120% water by weight, the time necessary for this absorption being substantially from 15 hrs. to 24 hrs. This time could be decreased or increased by utilizing hotter or colder water. However, it is not desirable to soak the beans for too long a period of time, as the cost of the final product would be increased, nor is it desirable to increase the cost by providing means for heating the water. In no case should water be used which is above the boiling point, or below freezing.

After the soaking operation the beans are placed upon racks and allowed to drain. The beans after draining are put in large kettles, and over the beans is poured a heavy solution of sodium chloride, the same being preferably from a 5% solution to one of 7%. The beans are boiled in this brine from about 1½ hrs. to 2 hrs., the length of boiling time depending upon the variety of bean used. For example, in the case of Manchu and Dunfield beans, they must cook in the brine 1½ hrs. and 2 hrs. respectively, while in the case of Illini beans, it has been found necessary to cook this type of bean 2½ hrs. or more. Thus this latter type of bean is less desirable than either of the other two.

The beans are boiled slowly and the temperature of the brine is raised slowly from 70° F. to boiling temperature, that is, 220° F., this temperature being that taken at the center of the brine. While the beans are boiling the outer shell or skin of the bean comes off and floats to the top of the vessel, together with a frothy, white material, forming a rather thick layer on the surface. This thick layer of material is removed from time to time during the boiling operation. It is necessary that this material be entirely removed, otherwise the resulting product will be bitter in taste.

The beans are boiled until they become of a soft, mealy consistency and after the boiling and skimming steps the beans are placed in a dehydrating device until they are thoroughly dry, that is, until from between 7% to 15% of the moisture remains. If the bean is tested after the dehydrating step, it is found that the bitter or unpleasant taste has entirely disappeared.

After the beans have been thoroughly dried, they are ground and milled, and the flour resulting therefrom is of a sweet, full, flavor, and may be kept indefinitely without spoiling and will not become wormy, rancid or moldy.

It is to be understood that I do not wish to be limited by the process described, which is merely by way of illustration and not limitation, as variations of the process will of course be apparent to those skilled in the art without departing from the spirit of the invention or the scope of the claims.

What is claimed is:

1. The method of processing soy beans to produce soy bean flour which includes, soaking the beans in water at substantially 70° F. until said beans have absorbed water in an amount of substantially 120% by weight, draining said beans, boiling said beans in brine until they become soft and mealy, skimming the boiling liquid from time to time to remove froth and skins, dehydrating said beans, and grinding and milling said beans.

2. The method of processing soy beans to produce soy bean flour which includes, soaking the beans in water until said beans have absorbed water in an amount of substantially 120% by weight, draining said beans, boiling said beans in brine until they become soft and mealy, dehydrating and drying said beans, and grinding and milling said beans.

3. The method of processing soy beans to produce soy bean flour which includes, soaking the beans in water for from about 15 to 24 hours, draining said beans, boiling said beans in brine until they become soft and mealy, dehydrating said beans, and grinding and milling said beans.

4. The method of processing soy beans to produce soy bean flour which includes, soaking the beans in water at substantially 70° F. for from between 15 to 24 hours, draining said beans, boiling said beans in brine until they become soft and mealy, removing the frothy material from the boiling beans, dehydrating, grinding and milling said beans.

5. The method of processing soy beans to produce soy bean flour which includes, soaking the beans in water until they have absorbed a substantial amount of water, draining said beans, boiling said beans in brine until they become soft and mealy, said brine including a sodium chloride solution of from between 5% and 7%, dehydrating, grinding and milling said beans.

6. The method of processing soy beans to produce flour, which includes soaking the beans in water until they are substantially twice as long as the unsoaked beans and have a large diameter of substantially twice the size of the large diametetr of the unsoaked beans, boiling the beans in brine until the skins are removed and the frothy material is wholly removed, skimming the boiling beans, dehydrating, grinding and milling said beans.

7. The method of processing soy beans which includes soaking the beans in water at 70° F. until the beans have absorbed water in an amount of substantially 120% by weight, boiling said beans in brine until they become soft and mealy, said brine including a sodium chloride solution of from between 5% to 7%, skimming the liquid from time to time to remove froth and skins, dehydrating, grinding and milling said beans.

8. The method of processing soy beans to produce soy bean flour which includes, soaking the beans in water at substantially 70° F. until said beans have absorbed water in an amount of substantially 120% by weight, draining said beans, boiling said beans in brine until they become soft and mealy, skimming the boiling liquid from time to time to remove froth and skins, dehydrating said beans until only 7% to 15% moisture remains in said beans, and grinding and milling said beans.

9. The method of processing soy beans to produce soy bean flour which includes, soaking the beans in water until said beans have absorbed water in an amount of substantially 120% by weight, draining said beans, boiling said beans in brine until they become soft and mealy, dehydrating and drying said beans until only 7% to 15% moisture remains in said beans, and grinding and milling said beans.

10. The method of processing soy beans to produce soy bean flour which includes, soaking the beans in water for from about 15 to 24 hours, draining said beans, boiling said beans in brine until they become soft and mealy, dehydrating said beans until only 7% to 15% moisture remains in said beans, and grinding and milling said beans.

11. The method of processing soy beans to produce soy bean flour which includes, soaking the beans in water at substantially 70° F. for from between 15 to 24 hours, draining said beans, boiling said beans in brine until they become soft and mealy, removing the frothy material from the boiling beans, dehydrating said beans until only 7% to 15% moisture remains in said beans, and grinding and milling said beans.

12. The method of processing soy beans to produce soy bean flour which includes, soaking the beans in water until they have absorbed a substantial amount of water, draining said beans, boiling said beans in brine until they become soft and mealy, said brine including a sodium chloride solution of from between 5% and 7%, dehydrating said beans until only 7% to 15% moisture remains in said beans, and grinding and milling said beans.

13. The method of processing soy beans which includes soaking the beans in water at 70° F. until the beans have absorbed water in an amount of substantially 120% by weight, boiling said beans in brine until they become soft and mealy, said brine including a sodium chloride solution of from between 5% to 7%, skimming the liquid from time to time to remove froth and skins, dehydrating said beans until only 7% to 15% moisture remains in said beans, and grinding and milling said beans.

14. The method of processing soy beans to produce soy bean flour which includes soaking the beans in water whereby the size of the beans is increased materially over that of the unsoaked beans in that the large diameter of the soaked beans is substantially twice that of the unsoaked beans and the length of the soaked beans is substantially twice that of the unsoaked beans, boiling said beans in brine until they become softened, dehydrating, and reducing the dehydrated beans to flour.

15. The method of processing soy beans to produce soy bean flour which includes soaking the beans in water whereby the size of the beans is increased materially over that of the unsoaked beans in that the large diameter of the soaked beans is substantially twice that of the unsoaked beans and the length of the soaked beans is substantially twice that of the unsoaked beans, boiling said beans in brine until they become softened, and reducing to substantially dehydrated flour.

ROLLIN H. MOULTON.